US012425209B2

(12) United States Patent
Scope et al.

(10) Patent No.: US 12,425,209 B2
(45) Date of Patent: Sep. 23, 2025

(54) SYSTEMS AND METHODS FOR DATA RETENTION AND PURGING

(71) Applicant: DBCompliant LLC, Chicago, IL (US)

(72) Inventors: Nicholas Craig Scope, Chicago, IL (US); Alexander Rasin, Chicago, IL (US)

(73) Assignee: DBCompliant LLC, Chicago, IL (US)

( * ) Notice: Subject to any disclaimer, the term of this patent is extended or adjusted under 35 U.S.C. 154(b) by 327 days.

(21) Appl. No.: 17/955,263

(22) Filed: Sep. 28, 2022

(65) Prior Publication Data

US 2023/0093900 A1    Mar. 30, 2023

Related U.S. Application Data

(60) Provisional application No. 63/249,355, filed on Sep. 28, 2021.

(51) Int. Cl.
*H04L 9/08* (2006.01)
*G06F 21/62* (2013.01)

(52) U.S. Cl.
CPC .......... *H04L 9/088* (2013.01); *G06F 21/6245* (2013.01)

(58) Field of Classification Search
CPC ............................. H04L 9/088; G06F 21/6245
See application file for complete search history.

(56) References Cited

U.S. PATENT DOCUMENTS

| | | | |
|---|---|---|---|
| 2011/0055559 A1 | 3/2011 | Li | |
| 2015/0163206 A1* | 6/2015 | McCarthy | G06F 21/6227 726/4 |

OTHER PUBLICATIONS

Nick Scope, et al., "Purging Data from Backups by Encryption", Aug. 31, 2021, 16th European Conference—Computer Vision—ECCV 2020, pp. 245-258. (Year: 2021).*
Scope, International Search Report and Written Opinion, PCT/US2022/045116, Jan. 13, 2023, 10 pgs.
Scope, International Preliminary Report on Patentability, PCT/US2022/045116, Apr. 2, 2024, 7 pgs.
Nick Scope et al., "Database Framework for Supporting Retention Policies", Springer Nature Switzerland AG 2021, C. Strauss et al. (Eds.): DEXA 2021, LNCS 12923, Aug. 31, 2021, 16 pgs., Retrieved from the Internet: https://doi.org/10.1007/978-3-030-86472-9_21.

(Continued)

*Primary Examiner* — Nelson S. Giddins
(74) *Attorney, Agent, or Firm* — SankerIP

(57) ABSTRACT

The various implementations described herein include methods and systems of data governance. In one aspect, a method of purging backup data includes obtaining a database table having a corresponding data policy and generating an encrypted version of the database table by applying an encryption key, including encrypting at least a portion of the database table. The method further includes identifying an expiration date for the encryption key based on the data policy, and storing the encryption key, the expiration date, and an encryption identifier for the encryption key in an encryption table. The method also includes receiving a command to back up the database table and, in response to the command, generating a backup of the encrypted version of the database table. The method further includes storing the backup and, when a current date is at least the expiration date for the encryption key, deleting the encryption key.

20 Claims, 13 Drawing Sheets

(56) References Cited

OTHER PUBLICATIONS

Nick Scope et al., "Purging Data from Backups by Encryption", Springer Nature Switzerland AG 2021, C. Strauss et al. (Eds.): DEXA 2021, LNCS 12923, Aug. 31, 2021, 21 pgs., Retrieved from the Internet: https://doi.org/10.1007/978-3-030-86472-9_23.

* cited by examiner

Policy Overview — 300

| Policy Overview | |
|---|---|
| Encryption Identifier | Int |
| Policy | Varchar(50) |
| Expiration Date | date |
| Encryption Key | Varchar(50) |

Figure 3A

Employee — 310

| Employee | |
|---|---|
| Employee Identifier | char(20) |
| Name | char(50) |
| Position | char(20) |
| Salary | int |
| Start Date | date |
| End Date | date |

Sale — 320

| Sale | |
|---|---|
| Sale Identifier | char(20) |
| Customer Identifier | char(20) |
| Employee Identifier | char(20) |
| Store Identifier | char(20) |
| Sale Date | date |
| Price | int |
| Notes | varchar(200) |

Customer — 330

| Customer | |
|---|---|
| Customer Identifier | char(20) |
| Customer Name | varchar(30) |
| Date of Birth | date |
| Address | varchar(100) |
| Enroll Date | date |
| Member Level | varchar(10) |

Figure 3B

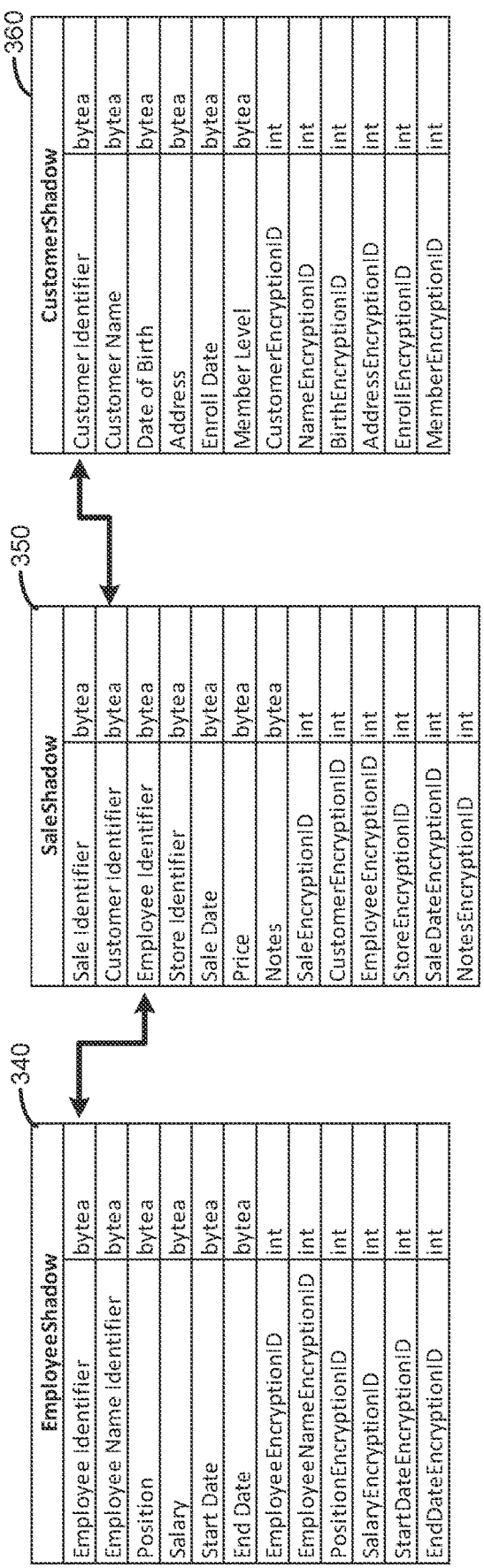
Figure 3C
Figure 3D
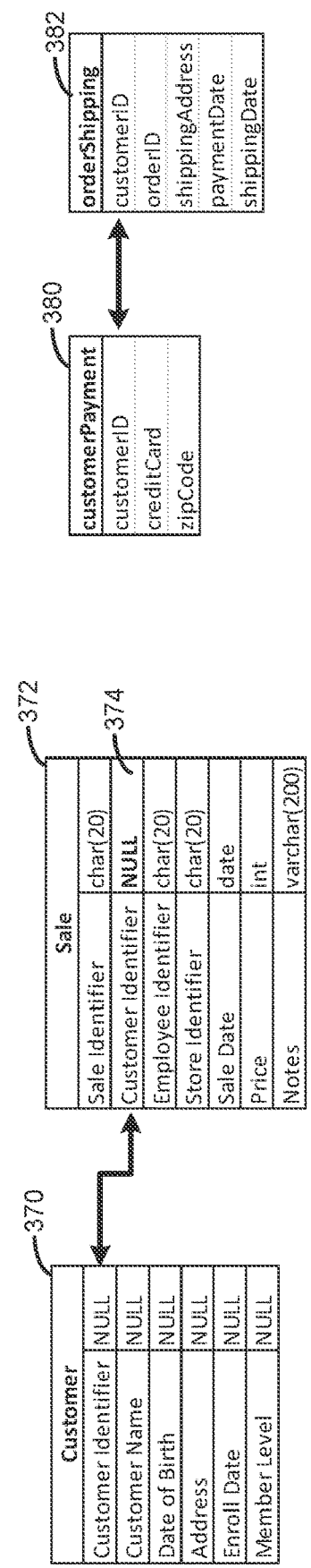
Figure 3E

SYSTEMS AND METHODS FOR DATA RETENTION AND PURGING

PRIORITY AND RELATED APPLICATIONS

This application claims priority to U.S. Provisional Patent Application No. 63/249,355, filed Sep. 28, 2021, entitled "Purging Data from Backups by Encryption," which is incorporated by reference herein in its entirety.

TECHNICAL DATA FIELD

This application relates generally to data governance, including but not limited to, policy-based data retention and purging via encryption.

BACKGROUND

Organizations' data management is often bound to data privacy regulations that define how the data must be stored (e.g., archived, preserved in backups, and/or destroyed). Additionally, new legislation is frequently passed in various jurisdictions to change the regulations. Moreover, organizations may have additional self-imposed internal policies or policies of another organization that is a business associate. Having a large number of quickly evolving policy sources adds a large element of complexity to data management and governance. Violating these requirements may potentially result in large fines and/or a permanent loss of customer data privacy. Further, current database compliance solutions in the data governance domain are limited and underdeveloped. The evolution of new and evolving requirements has far outpaced the development of dedicated functionality in data management systems. As a result, many organizations implement manual ad-hoc solutions to ensure compliance. As long as organizations depend on manual approaches, there is an increased risk of non-compliance and threat to customer data privacy.

SUMMARY

Data privacy requirements are a complex and quickly evolving part of the data management domain. Data storage is governed by multiple sources of policy requirements, including internal policies and legal requirements imposed by external governing organizations. Within a database, a single value can be subject to multiple requirements on how long it must be preserved and when it must be irrecoverably destroyed. This often results in a complex set of overlapping and potentially conflicting policies. As discussed above, existing storage systems lack sufficient support functionality for these critical and evolving rules, making compliance an underdeveloped aspect of data management.

Accordingly, there is a need for an automatic data governance system that improves compliance with internal policies and legal requirements. The current disclosure describes an automated and comprehensive data management framework that facilitates retention and purging compliance within a database management system. This framework can be integrated into existing databases without requiring changes to existing business processes. For example, some implementations described herein use SQL to set policies and automate compliance.

According to some embodiments, a method is performed at a data governance system. The method includes: (i) obtaining a database table having a corresponding data policy; (ii) generating an encrypted version of the database table by applying an encryption key to the database table, including encrypting one or more portions (e.g., all or less than all) of the database table; (iii) identifying an expiration date for the encryption key based on the data policy; (iv) storing the encryption key, the expiration date, and an encryption identifier for the encryption key in an encryption table; (v) receiving a command to back up the database table; (vi) in response to the command, generating a backup of the encrypted version of the database table; (vii) storing the backup of the encrypted version of the database table; and (viii) in accordance with a determination that a current date is at least the expiration date for the encryption key, deleting the encryption key from the encryption table.

In some embodiments, a computing system includes one or more processors, memory, and one or more programs stored in the memory. The programs are configured for execution by the one or more processors. The one or more programs include instructions for performing (or causing performance of) any of the methods described herein (e.g., the method 500).

In some embodiments, a non-transitory computer-readable storage medium stores one or more programs configured for execution by a computing system having one or more processors and memory. The one or more programs include instructions for performing (or causing performance of) any of the methods described herein (e.g., the method 500).

Thus, systems and devices are disclosed herein with improved methods for data governance. Such methods, systems, and devices may complement or replace conventional methods, systems, and devices for data governance.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 3A-3E illustrate example data tables in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In the data privacy and governance domain, the evolution of new and evolving requirements has far outpaced the development of dedicated functionality in data management systems. Additionally, dedicated data privacy compliance functionality has been neglected. Therefore, organizations currently either repurpose other functionality or depend on manual compliance solutions. Both of these options carry a risk of non-compliance due to the complexity of many data privacy requirements.

Compliance can be complex due to multiple overlapping requirements over the same data. For example, for health records, each state in the United States has its own requirements for retaining and destroying healthcare data. Adding to the complexity, the data of minors and adults is sometimes governed by different policies. Therefore, different rows and/or columns of a table belonging to different healthcare records may be governed by different requirements.

Differences in database logical layout and capability (e.g., relational or NoSQL) add another complication for implementing compliance. Furthermore, read and write accessibility adds additional complexity. For example, enforcing data purging compliance can be particularly challenging when records subject to different requirements are not guaranteed to always be accessible (e.g., offline and/or read-only backups).

The present disclosure describes systems for automated data privacy regulation enforcement, which can be integrated into existing relational databases. The present disclosure further describes frameworks for data policy compliance regarding retention and purging. The frameworks described herein allow users (e.g., database administrators) to define policies to automate enforcement.

Figure 1:
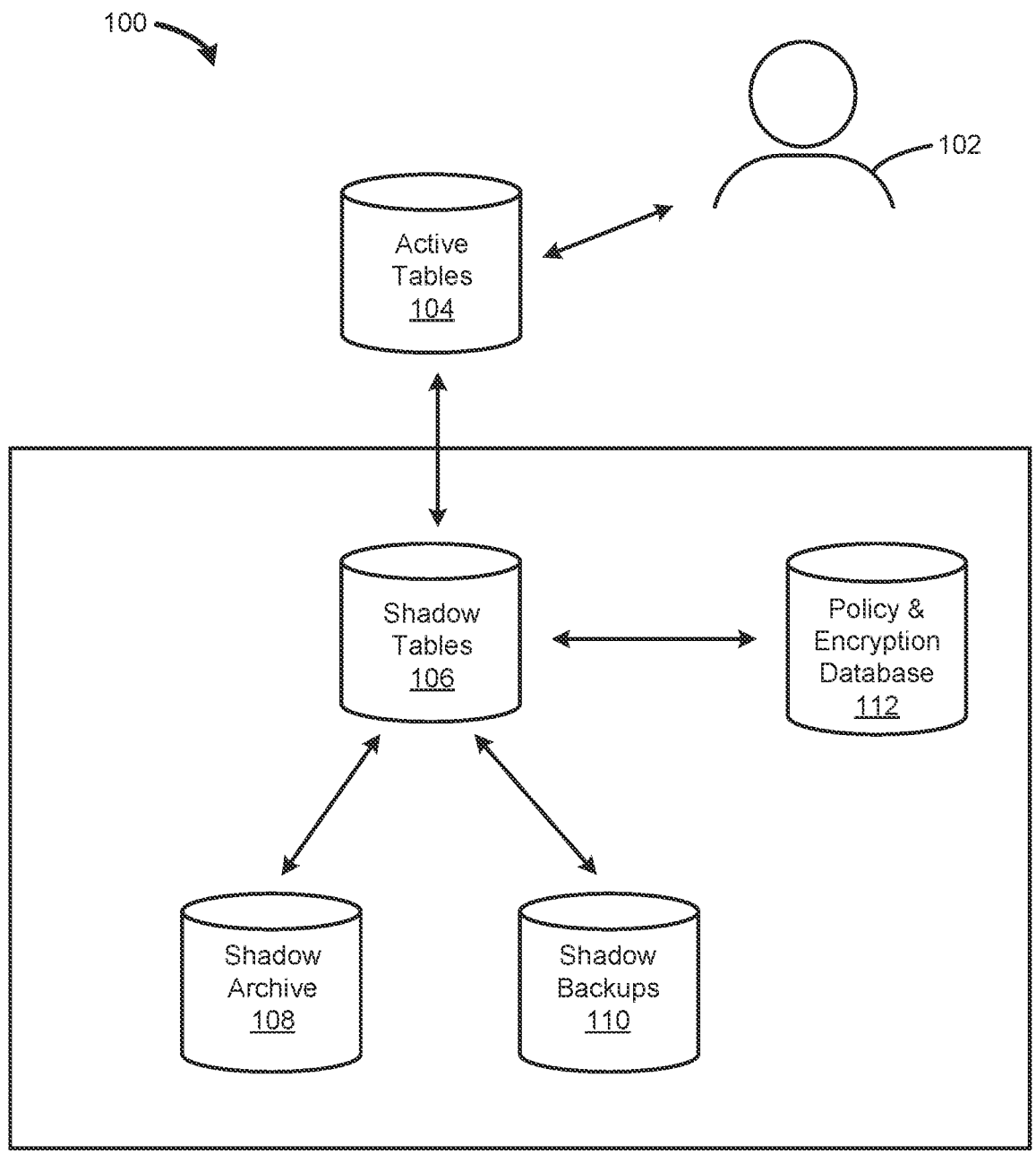
FIG. 1 illustrates an example data governance system in accordance with some embodiments.

Turning now to the figures, FIG. 1 illustrates a data governance system 100 in accordance with some embodiments. The data governance system 100 includes one or more active tables 104 (e.g., in an active database) that a user 102 is able to view and interact with. In some embodiments, the active tables 104 are table(s) in a database schema that are accessed by user queries (e.g., the active tables 104 are regular tables not altered by implementation of the data governance system 100). In accordance with some embodiments, the data governance system 100 further includes one or more shadow tables 106, a shadow archive 108, one or more shadow backups 110, and a policy-and-encryption database 112. In some embodiments, the data governance system 100 includes only a subset of the components shown in FIG. 1. For example, for non-retention frameworks the data governance system 100 may include the shadow tables 106, the shadow backups 110, and the policy-and-encryption database 112, but not the shadow archive 108. As another example, the data governance system 100 may include a policy database (e.g., for storing policy rules) and a separate and distinct encryption database (e.g., for storing encryption keys). In some embodiments, the presence and operation of the shadow tables 106, the policy-and-encryption database 112, the shadow archive 108, and the shadow backups 110 are transparent to the user 102.

In some embodiments, the shadow tables 106 are used to implement a purging mechanism for data in other tables. In some embodiments, the shadow tables 106 are backed up (e.g., instead of the active tables 104) as the shadow backups 110. In some embodiments, each data element that needs to eventually be purged (e.g., in accordance with one or more policies) in the active tables 104 is stored in an encrypted form in the shadow tables 106. In some embodiments, data elements and other values that are not flagged for purging are stored in an unencrypted form.

As used herein, "purging" is the permanent and irreversible destruction of data in a business record. If a part of a business record's data remains recoverable and/or accessible in some form, then the data purge is not considered successful. For example, if a file is deleted through a file system, but can still be recovered from the hard drive using forensic tools, this does not qualify as a purge. Similarly, records deleted through a database may be recoverable through forensic analysis and such records can be retained indefinitely within database backups. Examples of purging include: (i) physically destroying the device(s) which store the data, (ii) encrypting and later erasing the decryption key (although the ciphertext still exists, destroying the decryption key makes it irrecoverable), and (iii) by fully erasing data from all storage locations.

Some policies require an organization to purge business records when the data is no longer needed. Some privacy frameworks (e.g., GDPR) require organizations to purge business records at the request of a customer. Thus, organizations should be able to comply with purging policies as well as ad-hoc requests.

Organizational rules and requirements for data management are generally defined in terms of business records. A business record can be any memorandum, writing, entry, print, representation or combination thereof, of any act, transaction, occurrence, or event that is kept or recorded by any business institution, member of a profession or calling, or any department or agency of government in the regular course of business or activity. For example, business records describe interactions and/or transactions that result in new data.

Business records can be represented using different logical layouts. A business record may consist of a single document for an organization (e.g., an email message). However, in a database, a business record may span many combinations of rows across multiple tables. For example, a purchase order may include a buyer, a product, and a purchase transaction from three different tables. The process of mapping business records to underlying data can vary depending on an organization's requirements and their data storage platforms. In relational databases, business records are defined using Select-Project-Join SQL syntax.

In some embodiments, an encryption key is selected for each data element based on a purging policy that applies to the data element (e.g., based on policy information stored at the policy-and-encryption database 112) and a corresponding required purging date. In some embodiments, the encryption key is stored in the policy-and-encryption database 112. In some embodiments, purging is performed on the data element by deleting the encryption key (e.g., deleting the encryption key from the encryption database 112). By destroying the encryption key, the associated encrypted data is rendered (permanently and irreversibly) irrecoverable. In this way encryption is used to meet the requirements for purging data, even when the data to be purged is not always physically accessible. For example, in some embodiments, one or more of the shadow backups 110 are remote (e.g., off-site) and/or off-line backups. In some situations, any approach to achieving purging compliance must be able to purge data that is both physically accessible and inaccessible.

A data policy can be any established rule for data governance (e.g., for a given organization). A data policy may originate from any of a variety of sources, such as legislation, internal rules, best practices guidelines, and/or as a byproduct of a court ruling. Data policies can use time and/or external events as criteria for data retention and destruction.

In some embodiments, the shadow archive 108 includes one or more tables and serve as a retention mechanism for data from the active tables 104. For example, when data that is covered by a current retention policy is deleted or updated, a copy of this data is stored in the shadow archive 108. In some embodiments, the data stored in the shadow archive 108 inherits any encryption that was applied to the data in the shadow tables 106. In this way, the user 102 is able to delete the data from the active tables 104 but a copy is preserved in the shadow archive 108 to satisfy a retention requirement.

A retention policy may define conditions under which a business record must be preserved and/or requirements for data retention. Some retention requirements (e.g., HIPAA) may require a complete historical log of any and all business record updates (e.g., current address and full history of address changes for a patient). Organizations subject to this level of retention should archive the complete business record before every update to ensure a complete audit trail history is preserved.

FIGS. 2A-2D illustrate example data retention and purging with the data governance system 100 in accordance with some embodiments. In some embodiments, the data governance system 100 is trigger-based (e.g., triggered based on user commands to delete, insert, and/or update data in the active tables 104). For example, the data governance system 100 is implemented with DBMS trigger functionality.

Figure 2A:
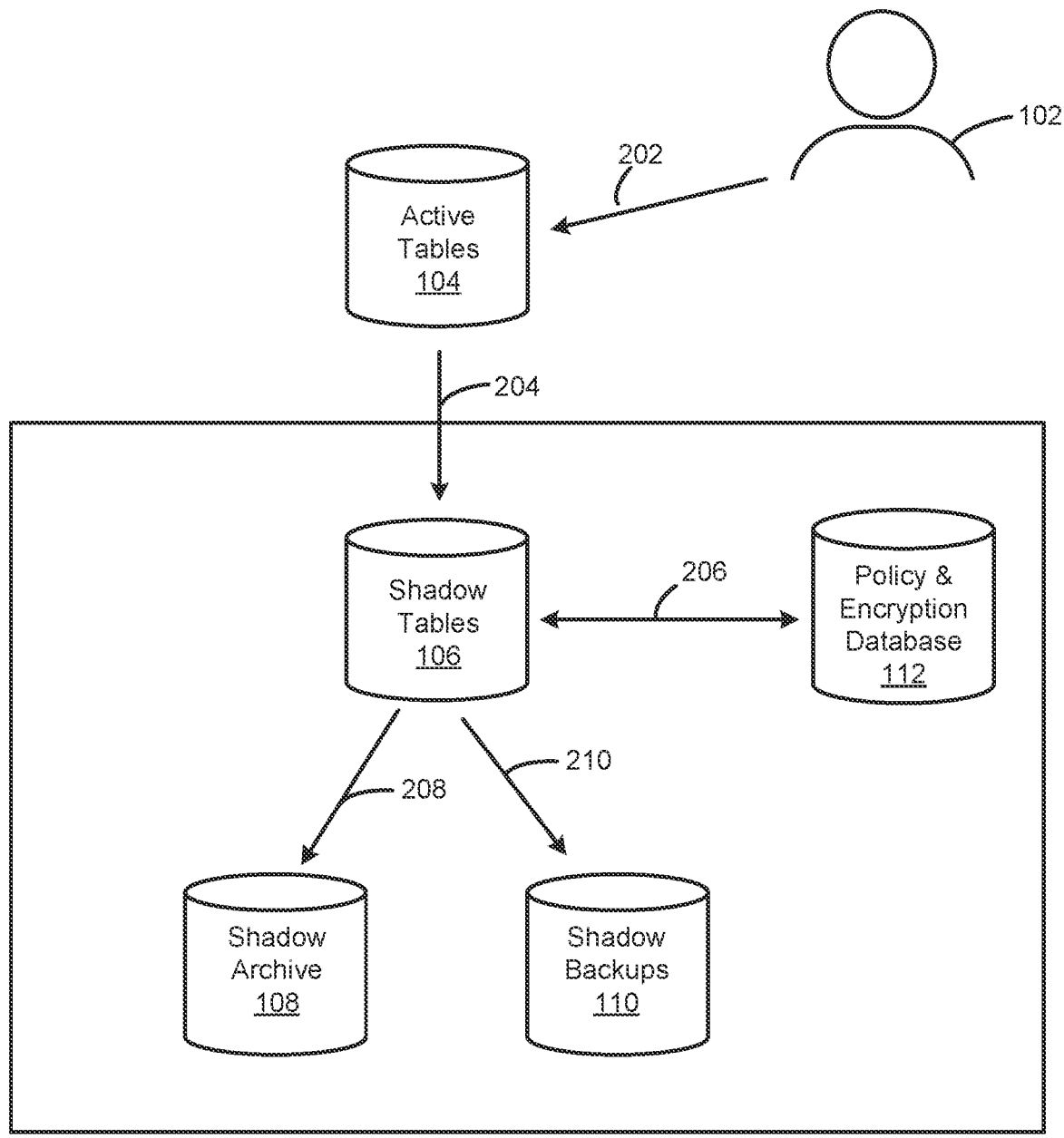
FIGS. 2A-2D illustrate example data retention and purging with the data governance system of FIG. 1 in accordance with some embodiments.

FIG. 2A shows the user 102 inputting an input 202 (e.g., including data and/or an update, insert, and/or delete command) to the active tables 104. In response to the input 202, data 204 corresponding to the input 202 is transferred to the shadow tables 106. In accordance with the data 204 being transferred to the shadow tables 106, a trigger execution communicates 206 with the policy-and-encryption database 112 to determine whether the data 204 is governed by a data retention and/or purging policy. In accordance with a determination that the data 204 is governed by a data retention policy, prior data 208 from the shadow tables 106 is transferred to the shadow archive 108 (e.g., for data retention purposes). In accordance with a determination that the data 204 is governed by a data purging policy, the data 204 is encrypted using encryption key(s) stored at the policy-and-encryption database 112 (e.g., encryption key(s) selected based on purge date(s) for the data 204). At a subsequent time, the updated (and encrypted) data 210 in the shadow tables 106 is transferred to the shadow backups 110.

Figure 2B:
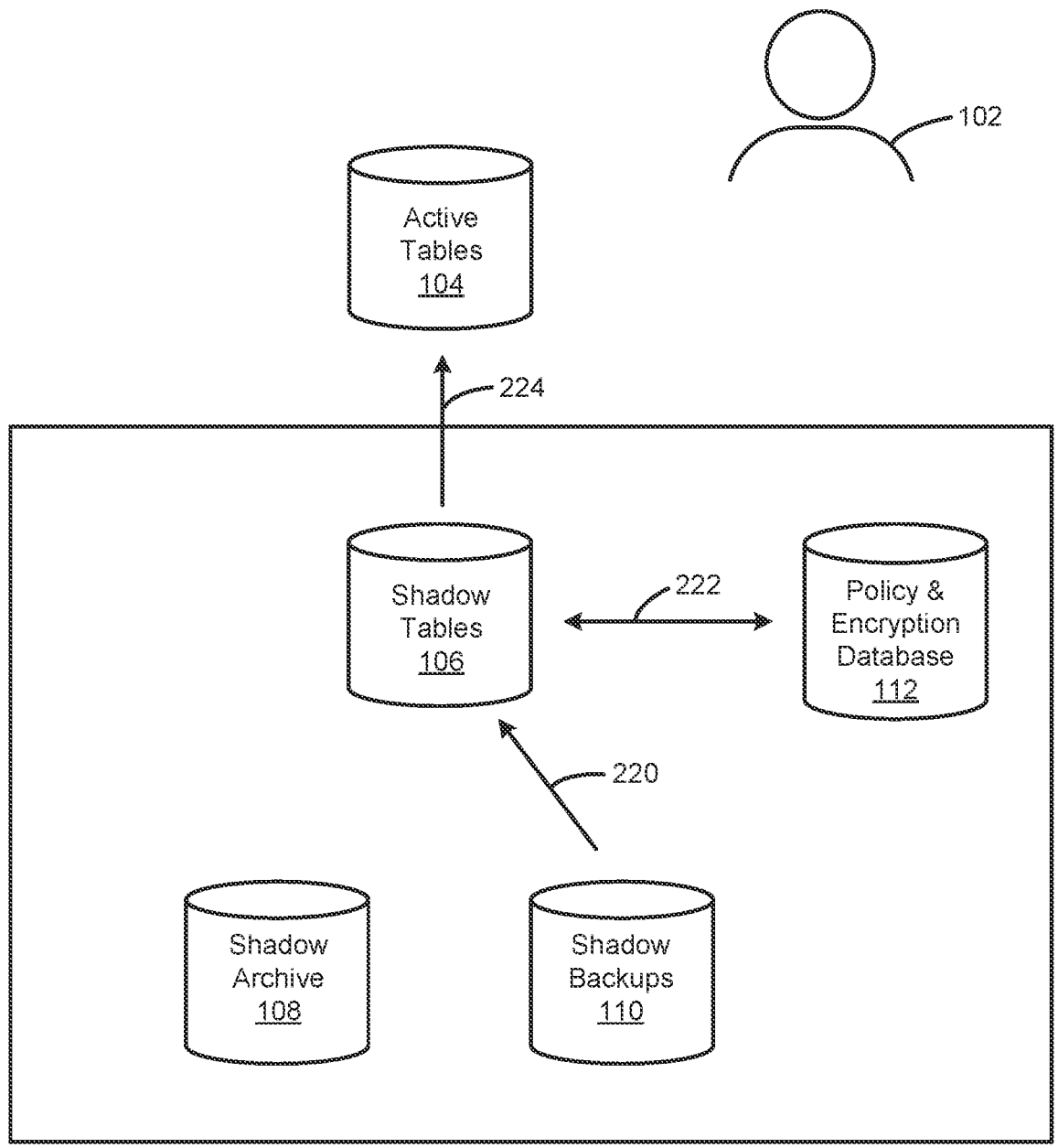

FIG. 2B shows an example of data from the shadow backups 110 being restored to the active tables 104 in accordance with some embodiments. In FIG. 2B, data 220 is transferred from the shadow backups 110 to the shadow tables 106 (e.g., in response to a restore request from the user 102). The data 220 is decrypted at the shadow tables 106 using one or more encryption keys from the policy-and-encryption database 112. In some embodiments, when the policy-and-encryption database 112 does not have an encryption key for a data element in the data 220, the data element is set to a NULL value. The decrypted data 224 from the shadow tables 106 is transferred to the active tables 104 (e.g., so that the user 102 can view and/or interacted with it).

Figure 2C:
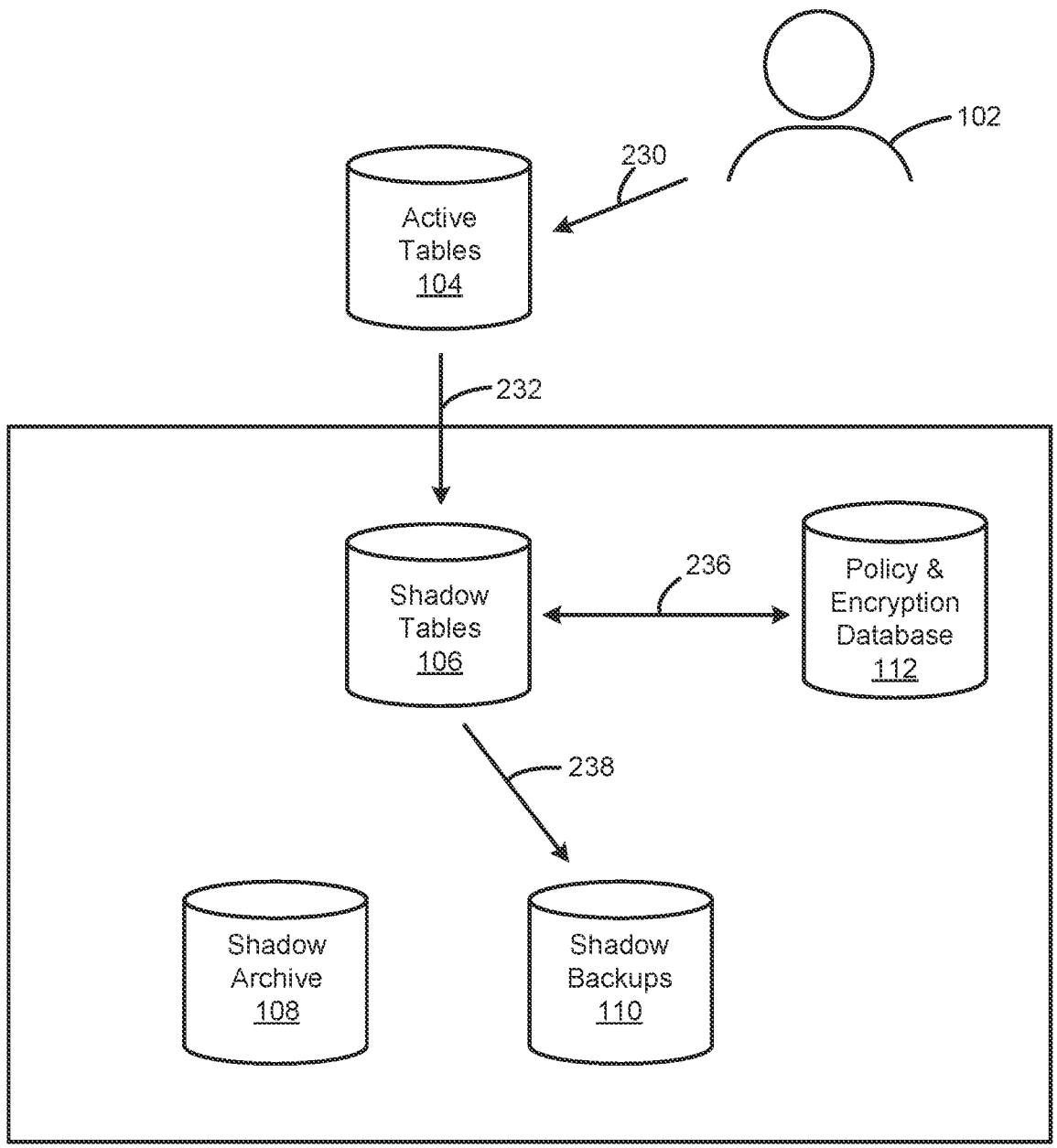

FIG. 2C shows an example of data from a user being stored to a backup in accordance with some embodiments. As show in FIG. 2C, the user 102 inputs an input 230 (e.g., including data and/or an update and/or insert command) to the active tables 104. In response to the input 230, data 232 corresponding to the input 230 is transferred to the shadow tables 106. The shadow tables 106 communicate 236 with the policy-and-encryption database 112 to determine whether the data 232 is governed by a data retention and/or purging policy. In accordance with a determination that the data 232 is governed by a data purging policy, the data 232 is encrypted using one or more encryption keys stored at the policy-and-encryption database 112 (e.g., encryption keys selected based on purge date(s) for the data 232). At a subsequent time, the updated (and encrypted) data 238 in the shadow tables 106 is transferred to the shadow backups 110.

Figure 2D:
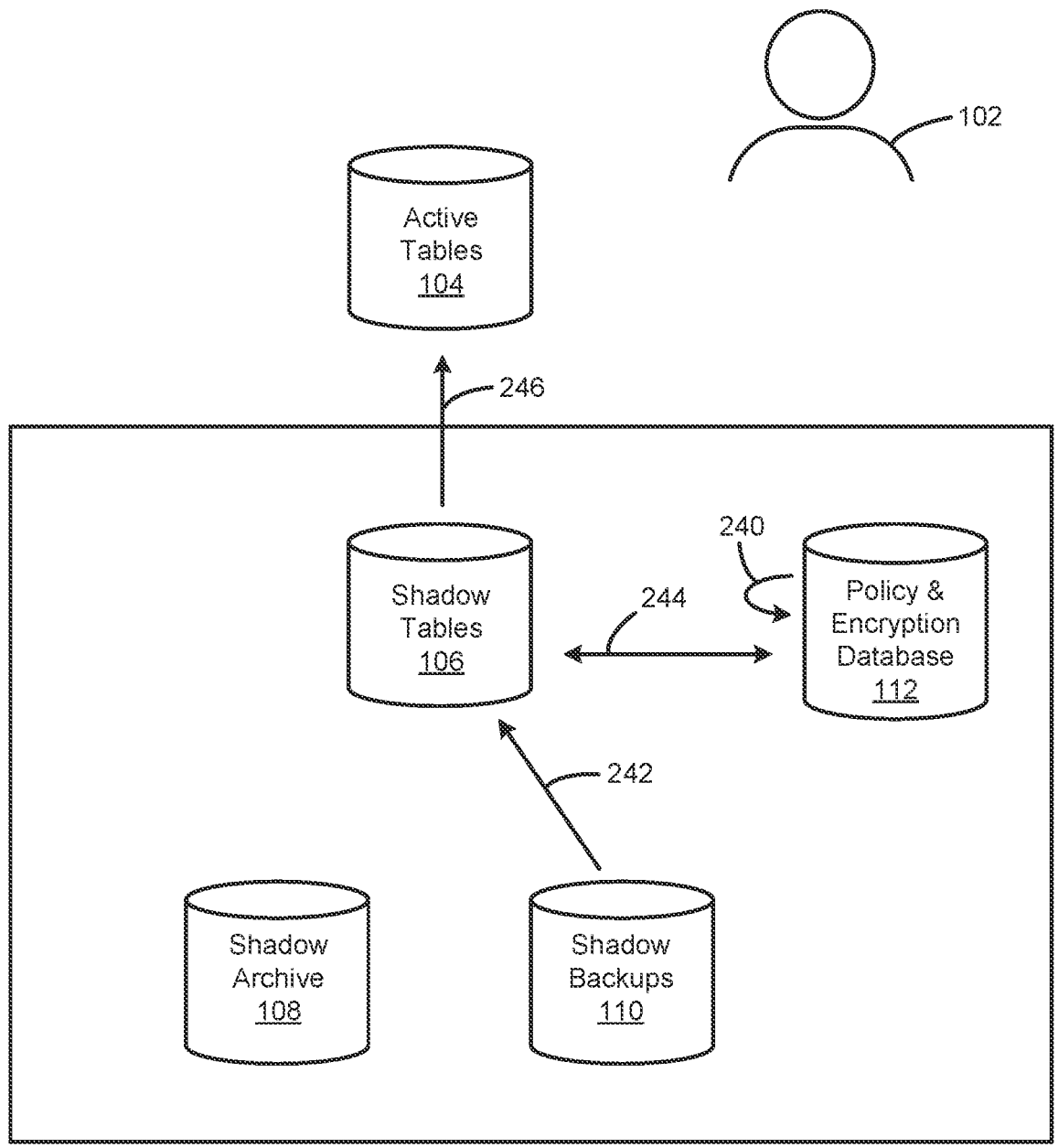

FIG. 2D shows an example of data from the shadow backups 110 being restored to the active tables 104 after an encryption key is deleted in accordance with some embodiments. In FIG. 2D, an encryption key 240 is deleted at a first time (e.g., based on a purging policy). Data 242 (e.g., corresponding to data 238 in FIG. 2C) is transferred from the shadow backups 110 to the shadow tables 106 at a second time, after the first time (e.g., in response to a restore request from the user 102). The data 242 is decrypted at the shadow tables 106 using one or more encryption keys from the policy-and-encryption database 112. In accordance with some embodiments, the policy-and-encryption database 112 does not include the encryption key 240 for a data element in the data 242 and therefore the data element encrypted with the encryption key 240 in the data 242 is set to a NULL value during decryption. The decrypted data 246 from the shadow tables 106 is transferred to the active tables 104 (e.g., so that the user 102 can view and/or interacted with it).

FIGS. 3A-3D illustrate example data tables in accordance with some embodiments. FIG. 3A shows a policy table 300 (also sometimes called a policy record) in accordance with some embodiments. The policy table 300 includes an encryption identifier (e.g., an integer field), a policy description field (e.g., a variable character field), an expiration date (e.g., a date field), and an encryption key (e.g., a variable character field). In accordance with some embodiments, the policy table 300 is stored at the policy-and-encryption database 112. In accordance with some embodiments, the policy table 300 is deleted upon the current date being the expiration date.

FIG. 3B shows an example schema in accordance with some embodiments. The example schema shown in FIG. 3B includes an employee table 310, a sale table 320, and a customer table 330. In accordance with some embodiments, the employee table 310 includes information about an employee of a company, the sale table 320 includes information about a sale (transaction) for the company, and the customer table 330 includes information about a customer of the company. As shown in FIG. 3B, the tables can include references to one another (e.g., the sale table 320 includes a reference to the employee table 310 and the customer table 330). In accordance with some embodiments, the employee table 310, the sale table 320, and the customer table 330 are stored at the active tables 104.

FIG. 3C shows an example shadow schema for the schema of FIG. 3B in accordance with some embodiments. The example shadow schema includes a shadow employee table 340 that corresponds to the employee table 310, a shadow sale table 350 that corresponds to the sale table 320, and a shadow customer table 360 that corresponds to the customer table 330. In some embodiments, the shadow tables (e.g., the employee table 340, the shadow sale table 350, and the shadow customer table 360) are stored at one or more of: the shadow tables 106, the shadow backups 110, and the shadow archive 108. The shadow tables include the fields from the corresponding tables, each of which may be encrypted in the shadow tables in accordance with one or more purge policies (e.g., purge policies stored at the policy-and-encryption database 112). In the example of FIG. 3C, each field in each shadow table is encrypted, as denoted by the "bytea" data type. The shadow tables (e.g., the employee table 340, the shadow sale table 350, and the shadow customer table 360) further include a respective encryption identifier for each encrypted field, which correspond to encryption keys stored (until the corresponding purge dates) in the policy-and-encryption database 112.

FIG. 3D shows an example schema in accordance with some embodiments. The example schema shown in FIG. 3D includes a customer table 370 and a corresponding sale table 372. In the example of FIG. 3D, the customer table 370 and the sale table 372 have been restored from a backup (e.g., from shadow backups 110) after an encryption key that corresponds to the customer identifier has been deleted. Therefore, the customer table 370 is removed (as all of the information would be NULL) and the sale table 372 includes a NULL value for the corresponding customer identifier. In some embodiments, the customer table 370 is removed (e.g., not restored) in accordance with the customer identifier field being unrecoverable (e.g., a NULL value is not permitted for the customer identifier field). In some embodiments, the customer table 370 is maintained and a fake identifier is inserted for the customer identifier (e.g., instead of a NULL value). In some embodiments, the fake identifier is a pseudo-anonymous identifier.

FIG. 3E shows an example schema in accordance some embodiments. The schema in FIG. 3E includes a customerPayment table 380 corresponding to a customer payment and an orderShipping table 382 corresponding to a shipping order.

Some embodiments include a new SQL syntax (e.g., a 'CREATE RETAIN' query) to define a set of business records to be protected from deletion. In some embodiments, policies are defined using a 'SELECT-PROJECT-JOIN' query (e.g., SQL queries cannot use aggregation).

In some embodiments, the 'CREATE RETAIN' query requires the SELECT clause to contain the primary key of every table appearing in the policy. In some embodiments, any columns referenced in the 'WHERE' clause must also be included. In some embodiments, these constraints are required to verify the retained copy in the archive against the relevant policy criteria. In some embodiments, each retention policy is handled independently, which may incur redundancy when policies overlap.

As an example, if a company has a requirement to retain all sales data (e.g., corresponding to the customerPayment table 380 and the orderShipping table 382) where the payment date is within the last 90 days. In this example, a policy is created to meet the requirement using the syntax of Policy Example 1 below:

| Policy Example 1 |
|---|
| CREATE RETAIN customerOrderRetain AS<br>SELECT *<br>FROM customerPayment NATURAL JOIN orderShipping |

| Policy Example 1 |
|---|
| WHERE DATEDIFF(day, orderShipping.paymentDate, date_part('day', CURRENT_DATE)) < 90; |

Some embodiments include a new SQL syntax (e.g., a 'CREATE PURGE' query) to define a purge policy. In some embodiments, when defining a purge policy, if a primary key attribute is included in a purge policy, all other columns are required to also be included. In some embodiments, the purge definition is required to include all child foreign keys of the table to maintain referential integrity.

As another example, consider a policy for the company that requires purging all shipping addresses where the shipping date is over 90 days old:

| Policy Example 2 |
|---|
| CREATE PURGE addressPurge AS<br>SELECT orderShipping.shippingAddress<br>FROM orderShpping<br>WHERE DATEDIFF(day, orderShipping. shippingDate, date_part('day', CURRENT_DATE)) > 90; |

In the example schema of FIG. 3E, the shippingDate column is required not to contain a NULL value (therefore, at least one column can be used to determine the purge expiration date).

In some embodiments, changes to the schema of a table with an active policy is prohibited. This limits the ability to circumvent policy requirements by making changes to a table's logical layout. For example, a user is allowed to make changes to a table, a user could accidentally violate retention requirements by dropping a table column with protected values. In some embodiments, in order to make schema changes, table policies must first be removed and reinstated after the changes have been made.

Figure 4A:
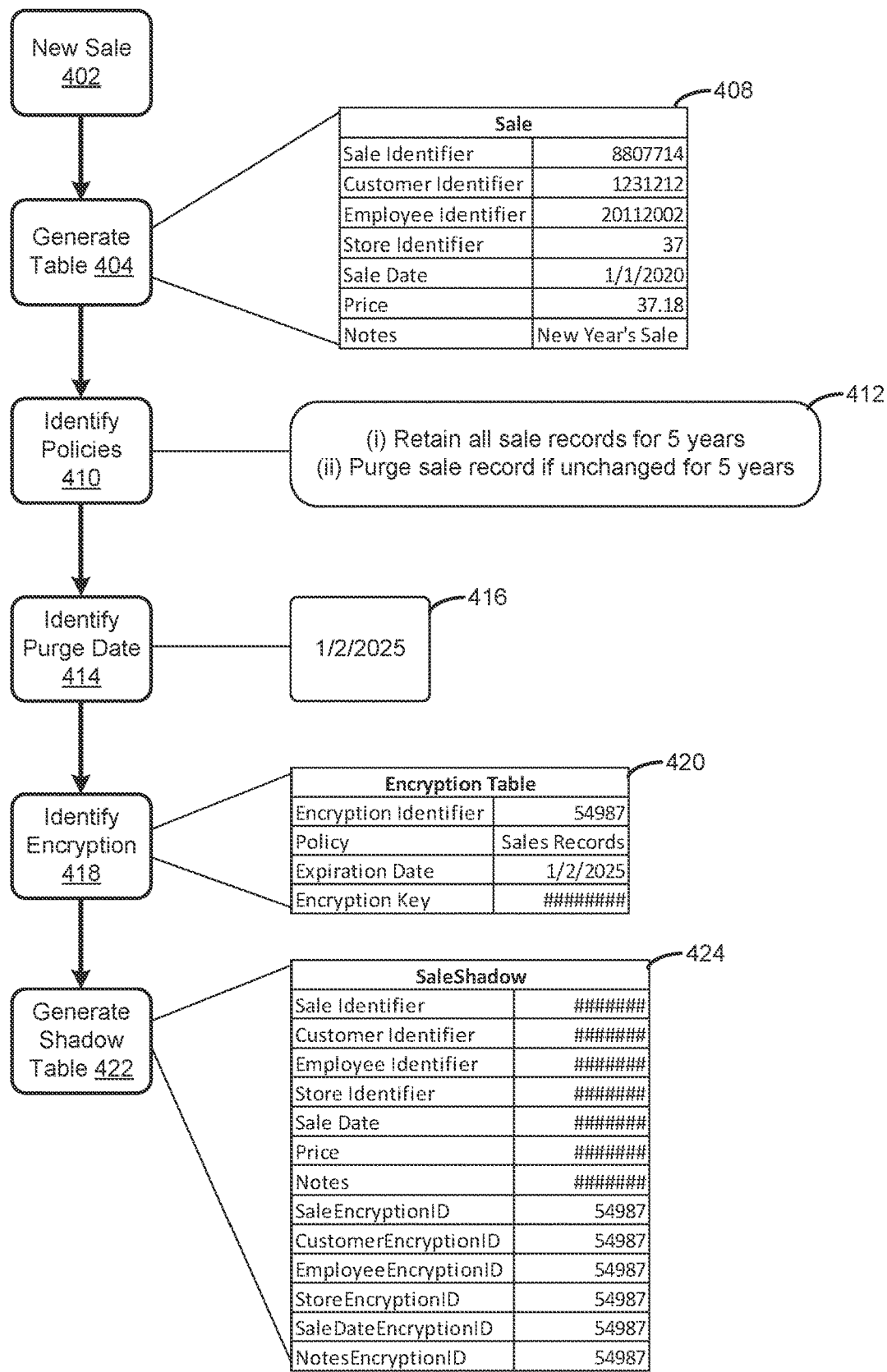
FIGS. 4A and 4B illustrate an example interaction sequence with the data governance system of FIG. 1 in accordance with some embodiments.
Figure 4B:
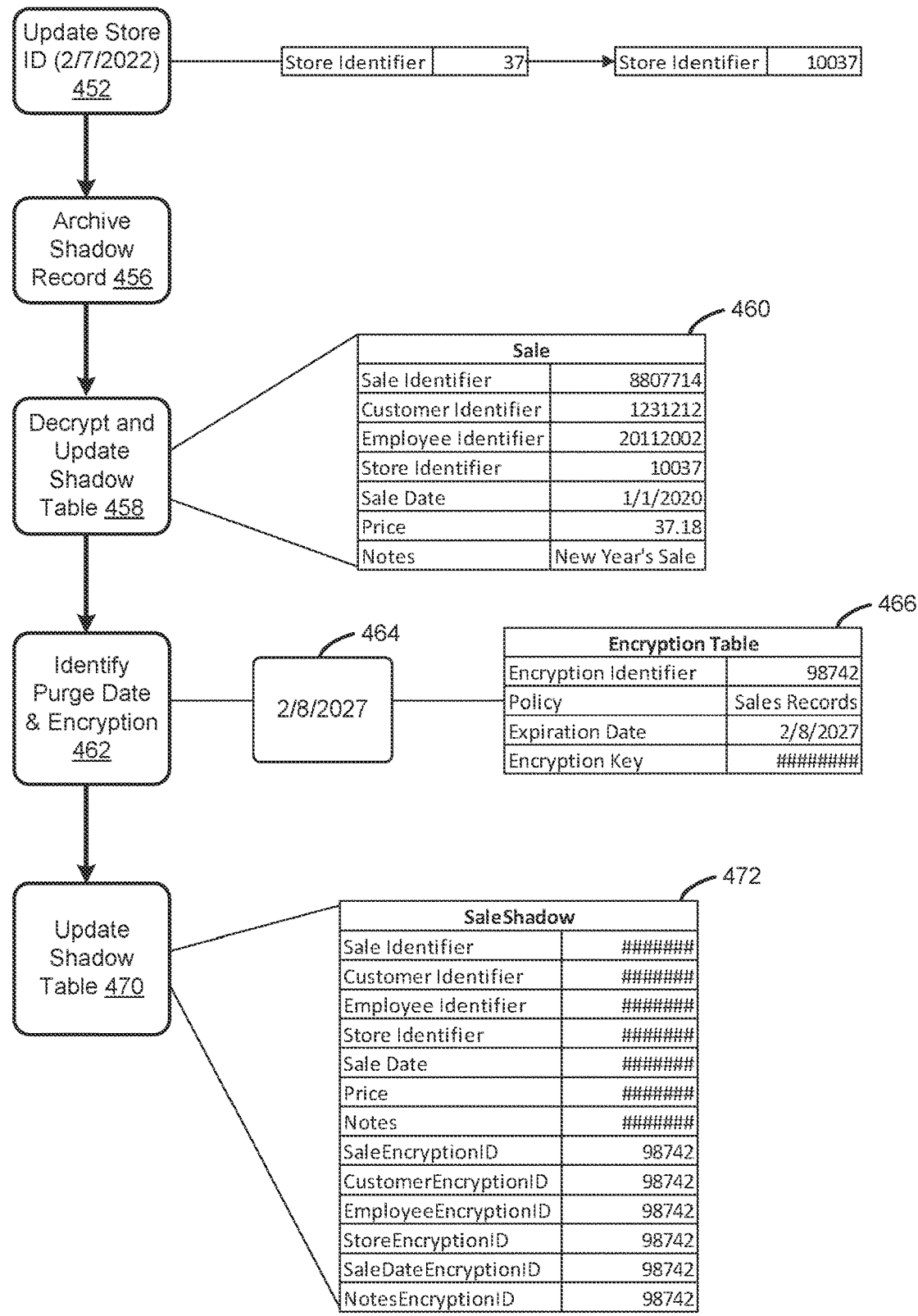

FIGS. 4A-4B illustrate an example interaction sequence with the data governance system 100 in accordance with some embodiments. First, at operation 402, a new sale is completed. At operation 404, a table (record) is generated, as illustrated by example sale table 408. In some embodiments, the table is stored in the active tables 104. At operation 410, applicable policies (e.g., policies 412) for the sale table 408 are identified. In this example, the applicable policies 412 include a data retention rule (to keep sale records for 5 years) and a data purge rule (e.g., to purge unchanged sale records after 5 years). At operation 414, a purge date (e.g., purge date 416) is identified based on the applicable policies 412. In some embodiments, if a data retention policy conflicts with a data purge policy, the data retention policy is given priority. For example, if a data purge policy includes a rule to delete a table after 1 year and a data retention policy includes a rule to keep the table for 18 months, the purge date is set for 18 months (e.g., purged at the expiration of the retention period). At operation 418, an encryption key is identified based on the purge date 416 (e.g., the encryption key corresponding to encryption table 420). For example, an encryption key is select that has an expiration date that matches the purge date for the data. At operation 422, an encrypted shadow table (e.g., the shadow sale table 424) is generated using the identified encryption key. In some embodiments, the encrypted shadow table is stored at the shadow tables 106. Although the shadow sale table 424 shows each field encrypted with the same encryption key (e.g., corresponding to encryption identifier '54987'), in some embodiments one or more fields are encrypted with a different encryption key (e.g., have a different purge date). In some embodiments, one or more fields are not encrypted (e.g., are not subject to a purge policy).

At operation 452, the store identifier referenced in the sale table 408 is updated (e.g., is updated from a value of '37' to a value of '10037') on a particular date (Feb. 7, 2022). At operation 456, the updated shadow sale record 424 is archived (e.g., a copy of the shadow sale record 424 is stored at shadow archive 108). At operation 458, the shadow sale table 424 is decrypted and the store identifier is updated, as shown in sale table 460. At operation 462, a new purge date (e.g., the purge date 464) is identified based on the update to the store identifier (e.g., per the policy 412, the sale table 460 should be purged 5 years after the update) and a corresponding encryption key is identified (e.g., the encryption key in encryption table 466). At operation 470, the shadow sale table is updated (e.g., encrypted using the encryption key in the encryption table 466), as illustrated in shadow sale table 472.

Figure 5A:
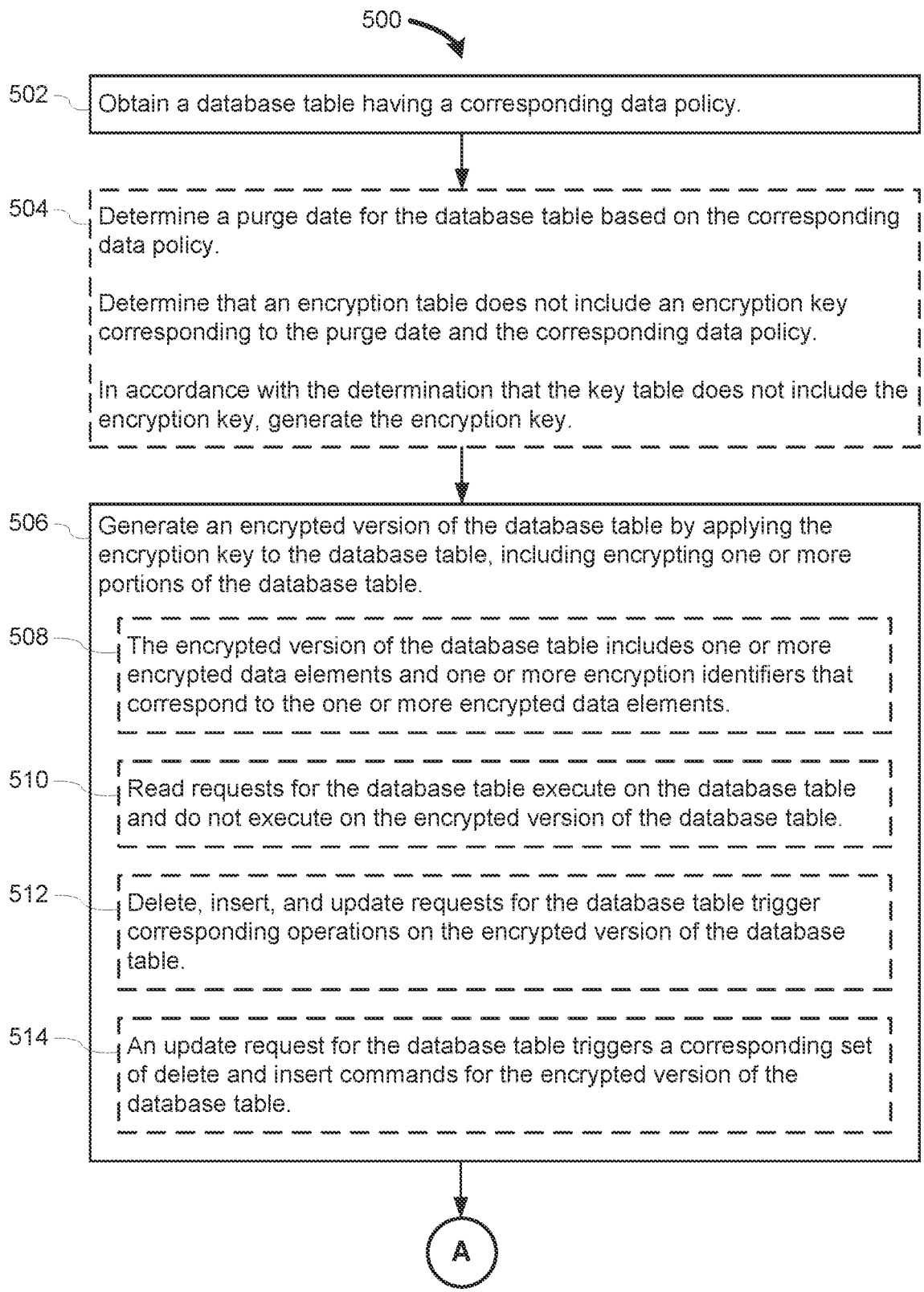
FIGS. 5A-5C provide a flowchart of a method for data governance in accordance with some embodiments.
Figure 5B:
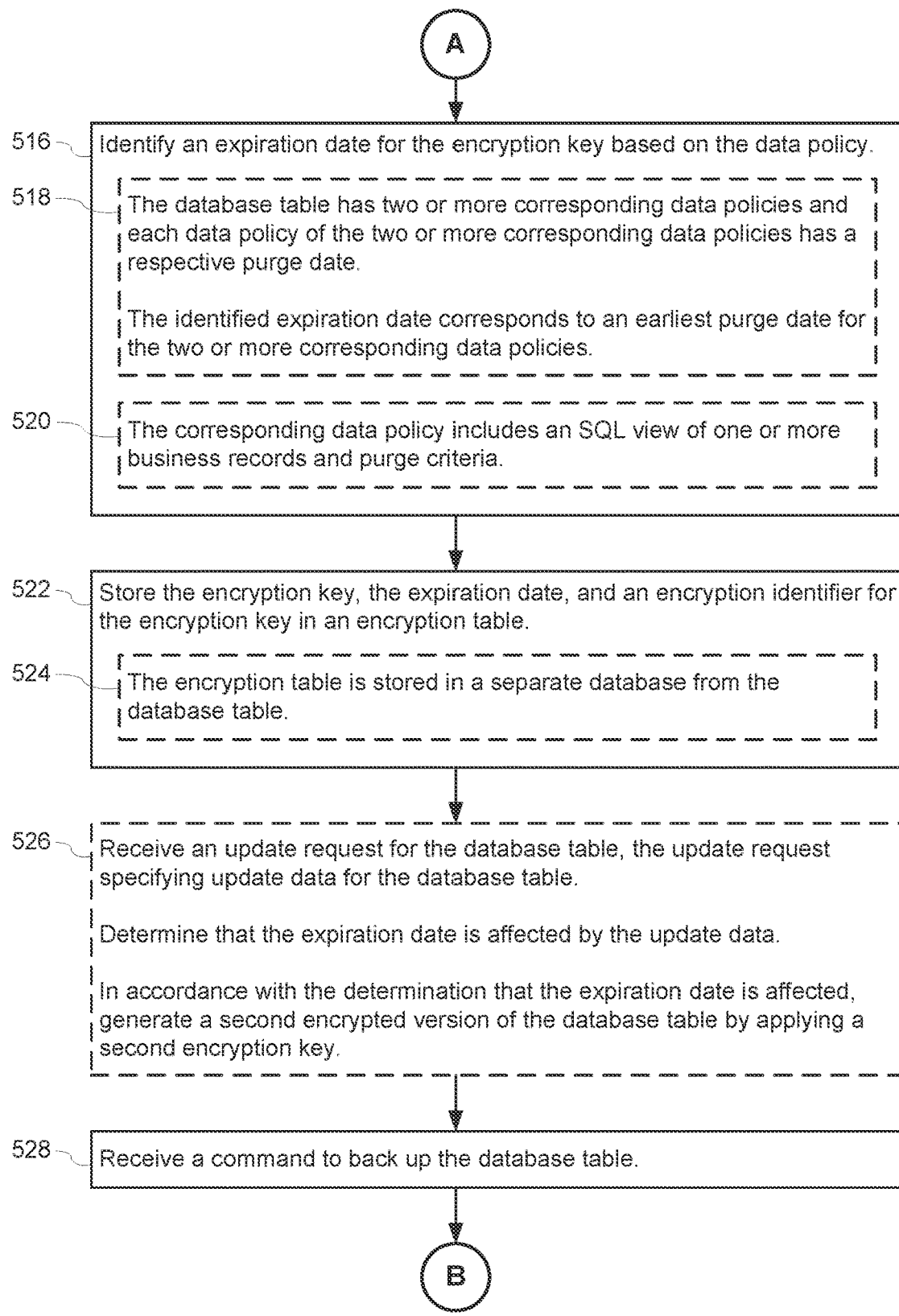
Figure 5C:
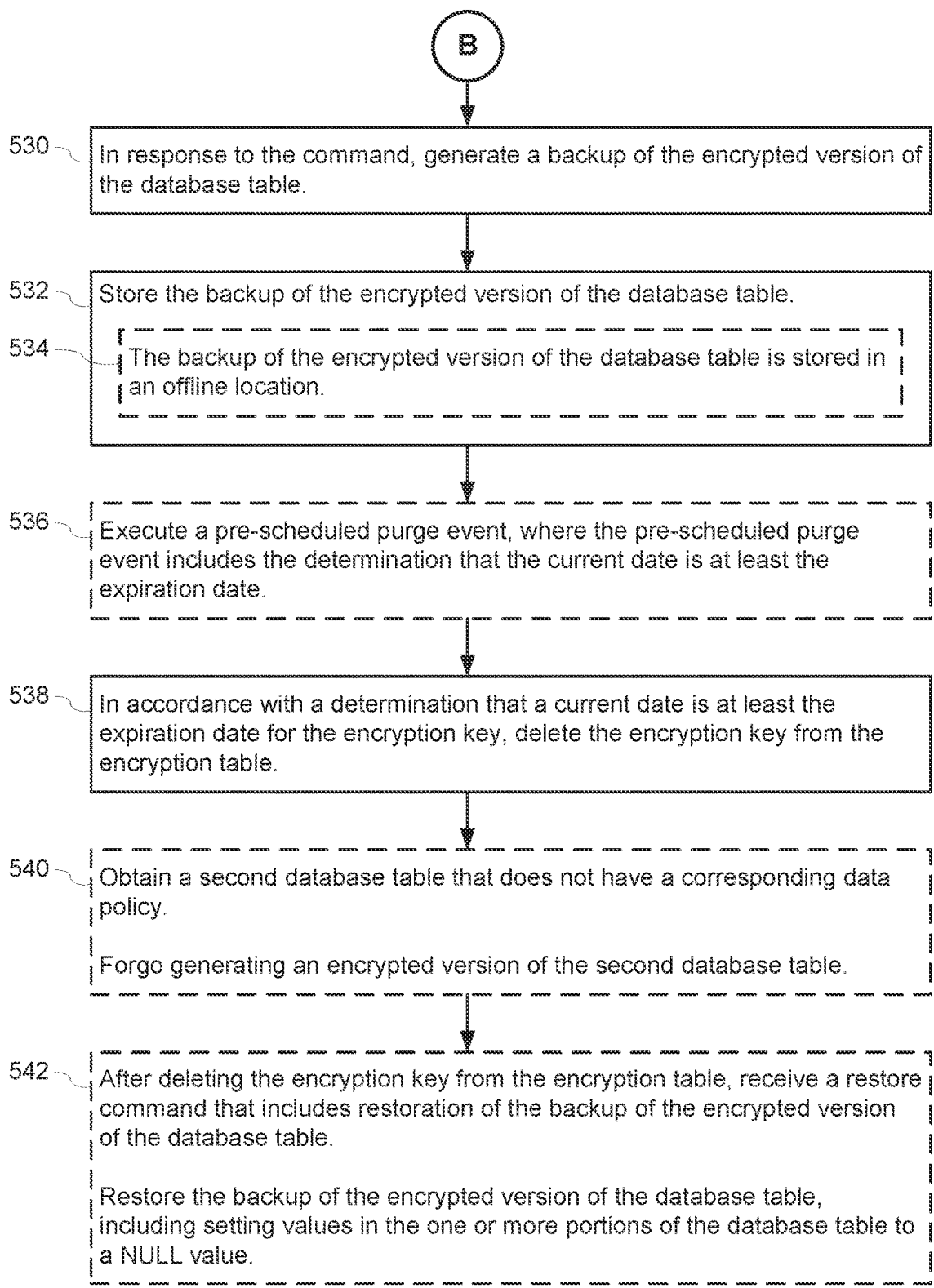

FIGS. 5A-5C provide a flowchart of a method 500 for data governance in accordance with some embodiments. The method 500 is performed at system (e.g., the data governance system 100). In some embodiments, the system is a server system (e.g., that receives inputs from a user via a client device). In some embodiments, the system is, or includes, a client device.

The system obtains (502) a database table having a corresponding data policy. For example, the employee table 310, the sale table 320, or the customer table 330 shown in FIG. 3B. In some embodiments, the database table has a plurality of corresponding data policies. For example, different fields in the database table have different applicable policies. As another example, a particular field in the database table has a plurality of applicable policies. In some embodiments, the database table is an active table (e.g., is one of the active tables 104).

In some embodiments, the system determines (504) a purge date for the database table based on the corresponding data policy; determines that an encryption table does not include an encryption key corresponding to the purge date and the corresponding data policy; and, in accordance with the determination that the key table does not include the encryption key, generates the encryption key. In some embodiments, the system queries an encryption database (e.g., the policy-and-encryption database 112) and determines that the encryption database does not include an encryption key having an expiration date that is the same as the purge date. In some embodiments, in accordance with a determination that the encryption database does not include an encryption key having an expiration date that is the same as the purge date, the system generates a new encryption key, uses the new encryption key to encrypt the database table, and stores the new encryption key in the encryption database.

The system generates (506) an encrypted version of the database table by applying the encryption key to the database table, including encrypting at least a portion of the database table. For example, the system applies one or more encryption keys to the tables in FIG. 3B to generate the encrypted tables in FIG. 3C. In some embodiments, the encrypted version of the database table includes one or more data elements that are not encrypted (e.g., one or more data elements that do not have an applicable purge policy).

In some embodiments, the encrypted version of the database table includes (508) one or more encrypted data elements and one or more encryption identifiers that correspond to the one or more encrypted data elements. For example, the shadow customer table 360 includes a customer identifier element, a customer name element, a date-of-birth element, an address element, and enroll-date element, and a member-level element and each element has a corresponding encryption identifier (e.g., encryption identifier 'CustomerEncryptionID' for the 'Customer Identifier' element).

In some embodiments, read requests for the database table execute (510) on the database table and do not execute on the encrypted version of the database table. In some embodiments, a user is allowed to interact with the active tables (e.g., the active tables 104) and is restricted from interacting with the shadow tables (e.g., the shadow tables 106).

In some embodiments, the system does not allow direct backups of the active tables. In some embodiments, the system replicates the active tables to the shadow tables. For example, when data is changed in the active tables (e.g., via an update and/or insert command), a copy of the data is entered in the shadow tables. In this way, only backups of the shadow tables (e.g., the shadow backups 110) are allowed (e.g., instead direct backups of the active tables). In some embodiments, for a restore operation, the backup restores the shadow tables, and then the shadow restores the active tables.

In some embodiments, delete, insert, and update requests for the database table trigger (512) corresponding operations on the encrypted version of the database table. In some embodiments, an update command to the active table is converted to a delete command followed by an insert command. In some embodiments, data is transferred from the active tables to the shadow tables in response to each update and/or insert command.

In some embodiments, an update request for the database table triggers (514) a corresponding set of delete and insert commands for the encrypted version of the database table. For example, the updated request triggers the corresponding set of delete and insert commands via a DBMS trigger functionality. In some embodiments, the delete command triggers a data retention event and the insert command triggers a data encryption-for-purging event.

The system identifies (516) an expiration date for the encryption key based on the data policy (e.g., the purge date 416). In some embodiments, in accordance with a data purge policy and a data retention policy applying to the data, an earliest purge date that is beyond the data retention period is identified.

In some embodiments, the database table has (518) two or more corresponding data policies and each data policy of the two or more corresponding data policies has a respective purge date; and the identified expiration date corresponds to an earliest purge date for the two or more corresponding data policies.

In some embodiments, the corresponding data policy includes (520) an SQL view (e.g., a virtual table) of one or more business records and purge criteria. In some embodiments, the purge criteria include one or more time-based criteria. In some embodiments, the purge criteria include one or more event-based criteria.

The system stores (522) the encryption key, the expiration date, and an encryption identifier for the encryption key in an encryption table (e.g., the encryption table 420).

In some embodiments, the encryption table is (524) stored in a separate database from the database table. In some embodiments, the encryption table is stored at an encryption database (e.g., the policy-and-encryption database 112).

In some embodiments, the system receives (524) an update request for the database table, the update request specifying update data for the database table; determines that the expiration date is affected by the update data; and, in accordance with the determination that the expiration date is affected, generates a second encrypted version of the database table by applying a second encryption key. For example, FIG. 4B shows an update to the store identifier in the sale table and subsequent generation of the shadow sale table 472.

The system receives (528) a command to back up the database table. In some embodiments, the backup command is sent from a user (e.g., a manually-triggered backup). In some embodiments, the backup command is triggered based on an amount of time since a previous back up (e.g., the amount of time meeting one or more criteria).

In response to the command, the system generates (530) a backup of the encrypted version of the database table. For example, the system sends a copy of the shadow tables 106 to the shadow backups 110. In some embodiments, the unencrypted tables (e.g., the tables shown in FIG. 3B) are not backed up. In some embodiments, only the encrypted tables (e.g., the tables shown in FIG. 3C) are backed up.

The system stores (532) the backup of the encrypted version of the database table (e.g., stores the back in the shadow backups 110). In some embodiments, the backup is stored at a location that is remote from the encrypted version of the database table.

In some embodiments, the backup of the encrypted version of the database table is (534) stored in an offline location. In some embodiments, the backup is stored in an offline format (e.g., is not connected to a network and/or not accessible remotely).

In some embodiments, the system executes (536) a pre-scheduled purge event, where the pre-scheduled purge event includes the determination that the current date is at least the expiration date. In some embodiments, the system is configured to execute a purge event at a preset interval (e.g., hourly, daily, weekly, or monthly). In some embodiments, the purge event is executed at an encryption database (e.g., the policy-and-encryption database 112).

In accordance with a determination that a current date is at least the expiration date for the encryption key, the system deletes (538) the encryption key from the encryption table. For example, the system deletes any encryption table (e.g., the encryption table 420) having an expiration date that is the current date or earlier.

In some embodiments, the system obtains (540) a second database table that does not have a corresponding data policy; and forgoes generating an encrypted version of the second database table. In some embodiments, the second database table is stored (e.g., in the shadow tables 106 and/or the shadow backups 110) in an unencrypted format. For example, for data that is not subject to a purge policy, the system stores the data in an unencrypted format.

In some embodiments, after deleting the encryption key from the encryption table, the system receives (542) a restore command that includes restoration of the backup of the encrypted version of the database table; and restores the backup of the encrypted version of the database table, including setting values in the at least a portion of the database table to a NULL value. For example, FIG. 3D shows customer table 370 and sale table 372, which correspond to restored versions of customer table 330 and sale table 320 (FIG. 3B) after expiration of an encryption key used to encrypt the customer table 330.

Figure 6:
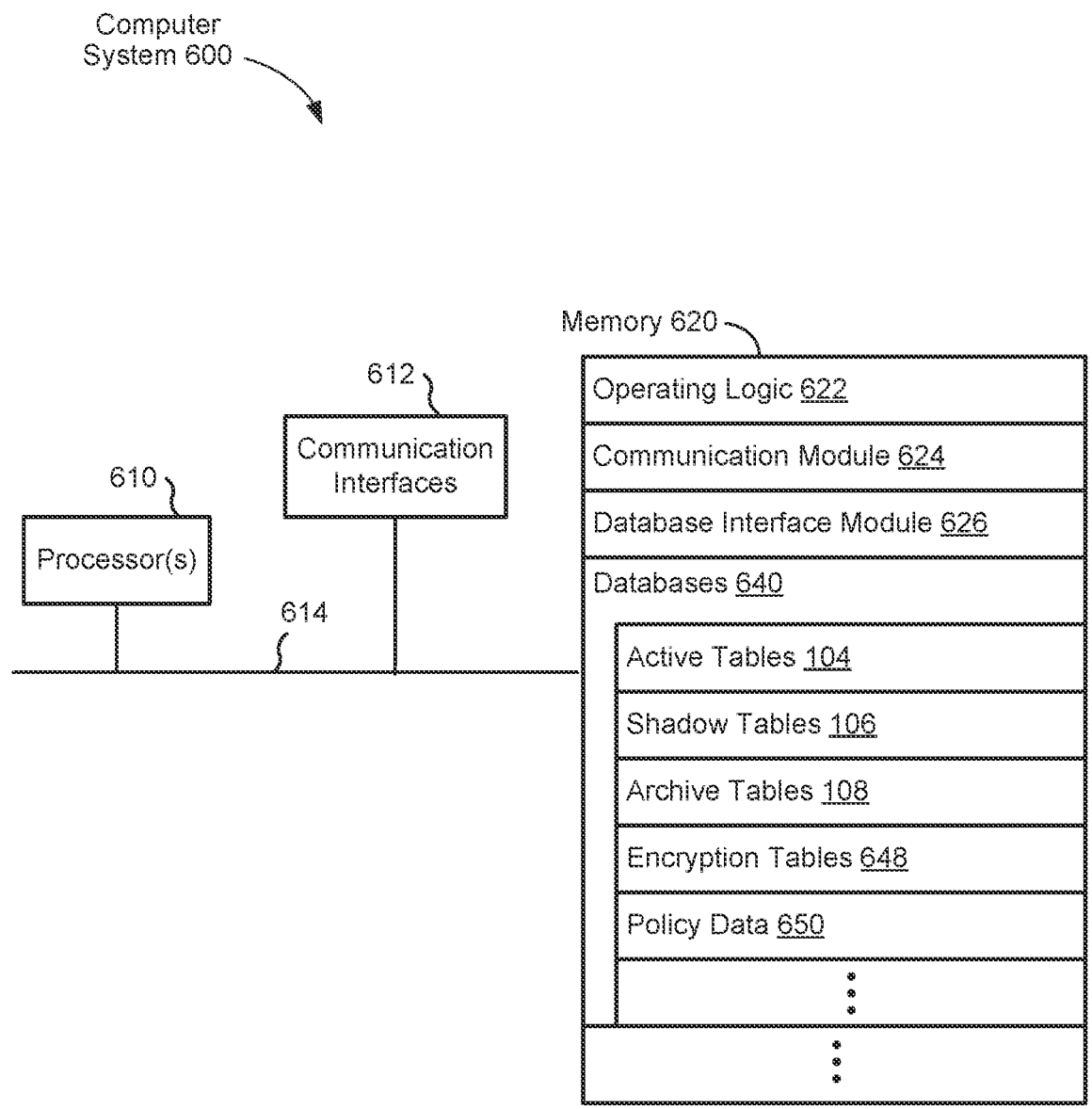
FIG. 6 is a block diagram of an example computer system in accordance with some embodiments.

FIG. 6 is a block diagram of a computer system 600 in accordance with some embodiments. The computer system 600 includes one or more processors 610 (e.g., CPUs, microprocessors, or processing units), a communication interface 612, memory 620, and one or more communication buses 614 for interconnecting these components (sometimes called a chipset). In some embodiments, the computer system 600 includes a user interface, including one or more input devices (such as a keyboard and a mouse) and one or more output devices, such as a display.

In some embodiments, the memory 620 in the computer system 600 includes high-speed random-access memory, such as DRAM, SRAM, DDR SRAM, or other random-access solid-state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within memory, includes a non-transitory computer-readable storage medium. In some embodiments, the memory, or the non-transitory computer-readable storage medium of the memory, stores the following programs, modules, and data structures, or a subset or superset thereof:

- operating logic 622, including procedures for handling various basic system services and for performing hardware dependent tasks;
- a communication module 624, which couples to and/or communicates with remote devices and remote systems in conjunction with the communication interfaces 612;
- a database interface module 626 for interfacing with one or more databases (e.g., databases 640), including for example, user commands (e.g., insert, update, and delete) and database management (e.g., encryption, purging, and/or archiving); and
- databases 640, which store one or more of:
  - the active tables 104 that a user 102 is able to view and interact with (e.g., accessed by user queries);
  - the shadow tables 106 for copying the active tables 104 and implementing data governance policies (e.g., corresponding to the policy data 650);
  - the archive tables 108 for retaining data subject to a retention policy;
  - encryption tables 648, such as encryption key information, including the policy table 300; and
  - policy data 650, such as purge and retention policy information for data in the active tables 104.

The computer system 600 can be implemented as any kind of computing device, such as an integrated system-on-a-chip, a microcontroller, a console, a desktop or laptop computer, a server computer, a tablet, a smart phone, or other mobile device. Thus, the computer system 600 includes components common to typical computing devices, such as a processor, random access memory, a storage device, a network interface, an I/O interface, and the like. The processor may be or include one or more microprocessors or application specific integrated circuits (ASICs). The memory may include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long-term storage of data or instructions in the computing device. The storage device may take the form of a magnetic or solid-state disk, tape, CD, DVD, or other reasonably high capacity addressable or serial storage medium. Multiple storage devices may be provided or are available to the computing device. Some of these storage devices may be external to the computing device, such as network storage or cloud-based storage. The network interface includes an interface to a network and can be implemented as either a wired or a wireless interface. The I/O interface connects the processor to peripherals (not shown) such as sensors, displays, cameras, color sensors, microphones, keyboards, and/or USB devices.

The computer system 600 can be utilized to implement any of the systems or methods described herein.

Turning now to some example embodiments of the methods, devices, systems, and computer-readable storage media described earlier.

Purging policies require that business records are made irreversibly irrecoverable. Data that is not physically accessible (e.g., stored on tapes in a warehouse) should still be purged when it expires. Storage backups may contain a mix of data that must be retained and data that must be purged. Thus, instead of physically destroying the entire storage medium, purging compliance generally requires a mechanism to purge only targeted data without compromising other records.

Accordingly, in some embodiments encryption is used as a means of remotely purging data. In some embodiments, shadow tables (e.g., the shadow tables 106) are generated that mirror the original tables with additional columns to enable cryptographic erasure functionality. In some embodiments, the shadow tables replace the role of active tables in database backup, and, during a restore, the shadow tables are restored then decrypted into the active table (minus any purged values). In some embodiments, in the shadow table(s), column(s) from the active table(s) are augmented by additional encryption identifier columns (e.g., as illustrated in FIG. 3C). This allows the system to uniquely identify the encryption key used for encrypting each value (data element) in the shadow table(s).

In some embodiments, data is copied to shadow archive tables (e.g., the shadow archives 108) when it is no longer needed (e.g., deleted) but still requires retention. By having a separate storage space for archived data and by moving data from shadow tables to the shadow archive tables, compliance is maintained without imposing a high performance overhead.

Some embodiments use triggers to transparently move data into the shadow archive, which stores both encrypted and nonencrypted data to achieve retention compliance. In some embodiments, shadow archive tables match the schema of the shadow tables with the additional entries (e.g., columns) for transaction identifier, sequence number, archive policy, and/or retention date. In some embodiments, the additional entries added to the primary key of the table (e.g., to guarantee database transactional integrity).

In some embodiments, whenever a row is deleted from the active tables, a copy of the business record's data requiring retention (if any) is first archived in the shadow archive. In some embodiments, when a transaction aborts, all of the retained records with the transaction identifier are asynchronously deleted. In some embodiments, the archived values are stored until the expiration of the corresponding retention date. In some embodiments, the shadow archive does not allow updates of any archived data. For example, if a record is archived and then, the updated record is re-archived (e.g., rather than replacing the original archived record).

(A1) In one aspect, some embodiments include a method of purging backup data (e.g., the method 500). The method includes (i) obtaining a database table having a corresponding data policy; (ii) generating an encrypted version of the database table by applying an encryption key to the database table, including encrypting at least a portion of the database table (e.g., a single portion that is less than all of the database table or multiple portions that encompass all of the database table); (iii) identifying an expiration date for the encryption key based on the data policy; (iv) storing the encryption key, the expiration date, and an encryption identifier for the encryption key in an encryption table; (v) receiving a command to back up the database table; (vi) in response to the command, generating a backup of the encrypted version of the database table; (vii) storing the backup of the encrypted version of the database table; and (viii) in accordance with a determination that a current date is at least the expiration date for the encryption key, deleting the encryption key from the encryption table. In some embodiments, the database table is stored in a relational database. In this way, select backup data corresponding to the encryption key is purged as it cannot be decrypted without the encryption key.

In some embodiments, the encryption keys are stored in a policy table (e.g., policy table 300, FIG. 3A), which is also sometimes called an encryption table. In some embodiments, the policy table is deleted once the expiration date occurs.

Some embodiments include a data purging workflow for remote destruction of expired data (e.g., inaccessible records stored in a backup) in a relational database via cryptographic erasure. In some embodiments, encryption keys are chosen based on the purging duration and policy. In some embodiments, records not subject to purging are stored without encryption. In some embodiments, when the purge date arrives, the encryption key is deleted, rendering all encrypted data permanently irrecoverable (e.g., purged).

Some embodiments include a retention policy that defines the records which must be preserved with an associated trigger that archives a copy of a deleted record. In some embodiments, a DELETE query proceeds whether or not the deleted record is covered by a retention policy and, when the deleted record is protected by a policy, it is stored in an archive table (e.g., the shadow archive table 108). In some embodiments, if the transaction aborts, archive tables are asynchronously purged of data archived by the transaction.

Some embodiments use SQL queries to define the underlying business records and the retention and/or purging criteria. In some embodiments, for retention, a date column is used to determine the criteria and is restricted from containing a NULL value. In some embodiments, for purging, a NULL value in the date column is interpreted as a purge immediately requirement. For example, whenever the purge date is set to a NULL value, the data is purged as soon as possible (e.g., at the expiration of the retention policy). For example, to calculate the purge date, the expiration of the longest applicable retention policy is used. As another example, if no retention policy applies to the value, the current date is used as the expiration date.

(A2) In some embodiments of A1, the method further includes: (i) determining a purge date for the database table based on the corresponding data policy; (ii) determining that the encryption table does not include the encryption key corresponding to the purge date and the corresponding data policy; and (iii) in accordance with the determination that the key table does not include the encryption key, generating the encryption key.

(A3) In some embodiments of A1 or A2, the method further includes executing a pre-scheduled purge event, wherein the pre-scheduled purge event includes the determination that the current date is at least the expiration date.

Some embodiments include a time-based policy for purging (e.g., bucketed per-day). In some embodiments, a bucket represents a collection of data, grouped by a time range and policy that is purged together as a single unit. In some embodiments, all data in the same bucket for the same policy uses the same encryption key.

(A4) In some embodiments of any of A1-A3, the encrypted version of the database table includes one or more encrypted data elements and one or more encryption identifiers that correspond to the one or more encrypted data elements.

(A5) In some embodiments of any of A1-A4, read requests for the database table execute on the database table and do not execute on the encrypted version of the database table.

(A6) In some embodiments of any of A1-A5, delete, insert, and update requests for the database table trigger corresponding operations on the encrypted version of the database table.

In some embodiments, a SELECT query queries data in the active tables (e.g., the active tables 104). In some embodiments, a SELECT ARCHIVE query is used to retrieve data from the archive tables. In some embodiments, the SELECT ARCHIVE query is extended with one or more join fields (e.g., to accommodate additional archive-only fields such as 'transactionID'). In some embodiments, the retrieval of data from the shadow archive is preceded by a function (e.g., PL/pgSQL in PostgreSQL) which decrypts the shadow archive into a non-encrypted archive table.

In some embodiments, when data is inserted into the database, a trigger is used to check whether any of the values fall under a defined purging policy. If any purging policies apply to the data, the necessary values are encrypted and the values (e.g., regardless of encryption status) are inserted into the shadow tables (e.g., with the corresponding encryption key ID added). In some embodiments, for values that do not require encryption, a value of −1 is used for the encryption key ID.

In some embodiments, UPDATE queries update the original values in the active tables as well as the shadow tables. In some embodiments, in the shadow tables, updating involves decrypting the encrypted values, updating them, and then re-encrypting them. In some embodiments, if the UPDATE targets a date field that is used as the criteria for purging, a different encryption key may be required (e.g., due to the changing period length) for the updated values. In some embodiments, if a date field used as criteria for purging is updated, the business record's values are decrypted, a new encryption key is identified, and the data is re-encrypted with the new encryption key. In some embodiments, archived data is restricted from being targeted by UPDATE queries.

In some embodiments, with respect to retention compliance, when a value of a business record (subject to a retention policy) is updated, the entire business record is first archived. This action allows for retention compliance by providing a complete audit trail history of the business record. In some embodiments, a 'sequenceNo' field (e.g., column) is used to facilitate sorting the audit trail history of business records.

In some embodiments, if a DELETE query targets values belonging to a business record with retention requirements, a check is performed to see if any of the values also belong to a record requiring purging. In some embodiments, if one or more of the values belong to a record requiring purging, the encrypted values from the shadow copy are moved into the shadow archive tables. In some embodiments, if a record does not have a purging requirement, it is moved from the shadow table to the shadow archive (e.g., due to all data being contained in the shadow tables regardless of purging requirement status).

In some embodiments, before a DELETE query is executed, a check is performed for any retention policies that apply to the target data. If no values require retention, the query proceeds as normal. In some embodiments, the DELETE query is executed on the shadow tables. In some embodiments, if any of the values in the shadow tables are subject to a retention policy, the entire business record is inserted from the shadow tables into the archive tables (e.g., thus inheriting the encryption and purging dates). In some embodiments, after the business record has been added to the shadow archive, the delete query executes as normal.

(A7) In some embodiments of A6, an update request for the database table triggers a corresponding set of delete and insert commands for the encrypted version of the database table.

(A8) In some embodiments of any of A1-A7, the method further includes: (i) receiving an update request for the database table, the update request specifying update data for the database table; (ii) determining that the expiration date is affected by the update data; and (iii) in accordance with the determination that the expiration date is affected, generating a second encrypted version of the database table by applying a second encryption key.

(A9) In some embodiments of any of A1-A8, the method further includes: (i) obtaining a second database table that does not have a corresponding data policy; and (ii) forgoing generating an encrypted version of the second database table. In some embodiments, a non-encrypted version is generated in place of the encrypted version.

(A10) In some embodiments of any of A1-A9, the backup of the encrypted version of the database table is stored in an offline location.

(A11) In some embodiments of any of A1-A10, the method further includes: (i) after deleting the encryption key from the encryption table, receiving a restore command that includes restoration of the backup of the encrypted version of the database table; and (ii) restoring the backup of the encrypted version of the database table, including setting values in the one or more portions of the database table to a NULL value. In some embodiments, the one or more portions include an entire row and the tuple is not restored.

Partial backups can be either incremental or delta. For example, a full backup is performed on a Sunday and daily partial backups are performed in the subsequent days. In this example, if a recovery is needed on Thursday, database utilities can restore the full back up from Sunday and then: (i) apply delta backups from Monday, Tuesday, and Wednesday, or (ii) apply Wednesday's incremental backup. In this way, either delta or incremental backups are allowed.

In some embodiments, the shadow tables include additional columns with encryption ID for each value in the corresponding active tables. In some embodiments, non-encrypted values are indicated with a '−1' entry in the encryption ID column (e.g., indicating that the column does not require decryption and can be restored as-is). In some embodiments, all values with non-expired encryption keys are decrypted into the corresponding active table during a restore. In some embodiments, for encrypted values encrypted with a purged encryption key, the values are set as 'NULL' in the active table. In some embodiments, a purging policy is set to include all child foreign keys of the table (e.g., in order to maintain referential integrity). In some embodiments, when all columns are purged from a row, the entire tuple is not restored (e.g., is ignored on restore).

For example, consider a database at a university where a student has a single advisor referenced by a foreign key. At this university, there is a policy that requires all faculty information to be purged when they leave the university. In that scenario, the policy definition is automatically extended to include the advisor column in the student table (e.g., the advisor column in the student table is required to be NULL-able).

(A12) In some embodiments of any of A1-A11, the encryption table is stored in a separate database from the database table. In some embodiments, the encryption table is not allowed to be backed up, copied, or duplicated.

In some embodiments, the policy table is stored and backed up separately from the database (e.g., the shadow tables) to avoid the problem of having the encryption keys stored with the backup. In some embodiments, access to the policy tables is established via a database link or in a federated fashion (e.g., allowing the keys to be kept completely separate from the encrypted data). Additionally, the policy table is much smaller than the database itself and therefore it is more efficient to physically purge the encryption keys to maintain purging compliance (rather than purge the database itself).

In some embodiments, the encryption keys (e.g., the policy table 300) are stored separately from the main database (e.g., to ensure that purged data cannot be decrypted). In some embodiments, the keys are exposed to the main database via a database link or a REST Service call. For example, a database link allows tables from an external database to be exposed to the current database as if the tables were co-located in the same database (e.g., using a Federated storage engine). In some situations, storing the keys separate provides that the amount of corresponding meta-data that needs to be destroyed is significantly smaller than the main database.

Because business records are intermixed within files, there can be values belonging to multiple business records subject to multiple policies (of both retention and purging). A full erasure of a file may at times satisfy purging requirements, but this would come at the cost of violating retention policy requirements. Therefore, a targeted erasure within a single file is preferred in some circumstances.

(A13) In some embodiments of any of A1-A12: (i) the database table has two or more corresponding data policies and each data policy of the two or more corresponding data policies has a respective purge date; and (ii) the identified expiration date corresponds to an earliest purge date for the two or more corresponding data policies.

In some situations, policy compliance dictates that retention takes priority over purging. In these situations, if any value is subject to both a purging and retention policy, the value must first be retained until it is no longer subject to a retention policy (e.g., values may not be purged if there is still an active retention requirement). Therefore, in these situations, a purging date must be greater than or equal to the retention date.

Consider the following example: Company X is required to delete customer financial data after five years. At some point in time, Company X is sued, and they retain financial data for their pending court case. They now have an active retention policy on all data relevant to the court case. If Company X were to delete the data due to it being subject to a purge policy, while the case is pending, it may be in violation of procedural law. Therefore, retention must take priority over any purging policy requirements in some situations.

In some embodiments, when a business record is subject to both retention and purging, a period of retention is determined and a purging date is determined. In some embodiments, if the retention period is less than or equal to the purging date, there is no conflict, and therefore no changes are required. In some embodiments, if the retention period's date is later than the purging date, the purging date is delayed until the retention policy's expiration.

In some embodiments, this conflict resolution is achieved by determining which encryption key to use. For example, if a retention policy dictates the purging date must be delayed, the delayed date is used to determine which encryption key is used (e.g., an encryption key having an expiration date that is the same as the delayed date). In some embodiments, identifying the purging date and selecting the encryption key to apply is determined on a per-value granularity. In some embodiments involving relational databases, in order to avoid violating a key constraint, delaying the purge of a non-key value in a tuple includes delaying the purge of the tuple's primary key (e.g., other non-key attributes can be purged earlier).

(A14) In some embodiments of any of A1-A13, the corresponding data policy comprises an SQL view of one or more business records and purge criteria.

In another aspect, some embodiments include a computing system including one or more processors and memory coupled to the one or more processors, the memory storing one or more programs configured to be executed by the one or more processors, the one or more programs including instructions for performing any of the methods described herein (e.g., the method 500 and A1-A14 above).

In yet another aspect, some embodiments include a non-transitory computer-readable storage medium storing one or more programs for execution by one or more processors of a computing system, the one or more programs including instructions for performing any of the methods described herein (e.g., the method 500 and A1-A14 above).

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first and second are, in some instances, used herein to describe various elements, these elements should not be limited by these terms. These terms are used only to distinguish one element from another.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope to the precise forms disclosed. Many modifications and variations are possible in view of the above teachings. The embodiments were chosen and described in order to best explain the main principles and practical applications, to thereby enable others skilled in the art to best utilize the various embodiments and make various modifications as are suited to the particular use contemplated.

What is claimed is:

1. A method of purging backup data, the method comprising:
   obtaining a database table having a corresponding data policy;
   generating an encrypted version of the database table by applying an encryption key to the database table, including encrypting one or more portions of the database table;
   identifying an expiration date for the encryption key based on the data policy;
   storing the encryption key, the expiration date, and an encryption identifier for the encryption key in an encryption table;
   receiving a command to back up the database table;
   in response to the command, generating a backup of the encrypted version of the database table;
   storing the backup of the encrypted version of the database table; and
   in accordance with a determination that a current date is at least the expiration date for the encryption key, deleting the encryption key from the encryption table.

2. The method of claim 1, further comprising:
   determining a purge date for the database table based on the corresponding data policy;
   determining that the encryption table does not include the encryption key corresponding to the purge date and the corresponding data policy; and
   in accordance with the determination that the encryption table does not include the encryption key, generating the encryption key.

3. The method of claim 1, further comprising executing a pre-scheduled purge event, wherein the pre-scheduled purge event includes the determination that the current date is at least the expiration date.

4. The method of claim 1, wherein the encrypted version of the database table includes one or more encrypted data elements and one or more encryption identifiers that correspond to the one or more encrypted data elements.

5. The method of claim 1, wherein read requests for the database table execute on the database table and do not execute on the encrypted version of the database table.

6. The method of claim 1, wherein delete, insert, and update requests for the database table trigger corresponding operations on the encrypted version of the database table.

7. The method of claim 6, wherein an update request for the database table triggers a corresponding set of delete and insert commands for the encrypted version of the database table.

8. The method of claim 1, further comprising:
   receiving an update request for the database table, the update request specifying update data for the database table;
   determining that the expiration date is affected by the update data; and
   in accordance with the determination that the expiration date is affected, generating a second encrypted version of the database table by applying a second encryption key.

9. The method of claim 1, further comprising:
   obtaining a second database table that does not have a corresponding data policy; and
   forgoing generating an encrypted version of the second database table.

10. The method of claim 1, wherein the backup of the encrypted version of the database table is stored in an offline location.

11. The method of claim 1, further comprising:
    after deleting the encryption key from the encryption table, receiving a restore command that includes restoration of the backup of the encrypted version of the database table; and
    restoring the backup of the encrypted version of the database table, including setting values in the one or more portions of the database table to a NULL value.

12. The method of claim 1, wherein the encryption table is stored in a separate database from the database table.

13. The method of claim 1, wherein the database table has two or more corresponding data policies and each data policy of the two or more corresponding data policies has a respective purge date; and
    wherein the identified expiration date corresponds to an earliest purge date for the two or more corresponding data policies.

14. The method of claim 1, wherein the corresponding data policy comprises an SQL view of one or more business records and purge criteria.

15. A computing device, comprising:
    one or more processors; and
    memory coupled to the one or more processors, the memory storing one or more programs configured to be executed by the one or more processors, the one or more programs including instructions for:
       obtaining a database table having a corresponding data policy;
       generating an encrypted version of the database table by applying an encryption key to the database table, including encrypting at least a portion of the database table;
       identifying an expiration date for the encryption key based on the data policy;
       storing the encryption key, the expiration date, and an encryption identifier for the encryption key in an encryption table;
       receiving a command to back up the database table;

in response to the command, generating a backup of the encrypted version of the database table;

storing the backup of the encrypted version of the database table; and in accordance with a determination that a current date is at least the expiration date for the encryption key, deleting the encryption key from the encryption table.

16. The computing device of claim 15, wherein the one or more programs further include instructions for:

determining a purge date for the database table based on the corresponding data policy;

determining that the encryption table does not include the encryption key corresponding to the purge date and the corresponding data policy; and in accordance with the determination that the encryption table does not include the encryption key, generating the encryption key.

17. The computing device of claim 15, wherein the one or more programs further include instructions for executing a pre-scheduled purge event, wherein the pre-scheduled purge event includes the determination that the current date is at least the expiration date.

18. The computing device of claim 15, wherein the encrypted version of the database table includes one or more columns and each column of the one or more columns includes the encryption identifier.

19. The computing device of claim 15, wherein the one or more programs further include instructions for:

receiving an update request for the database table, the update request specifying update data for the database table;

determining that the expiration date is affected by the update data; and in accordance with the determination that the expiration date is affected, generating a second encrypted version of the database table by applying a second encryption key.

20. A non-transitory computer-readable storage medium storing one or more programs configured for execution by a computer system having one or more processors and memory, the one or more programs comprising instructions for:

obtaining a database table having a corresponding data policy;

generating an encrypted version of the database table by applying an encryption key to the database table, including encrypting at least a portion of the database table;

identifying an expiration date for the encryption key based on the data policy;

storing the encryption key, the expiration date, and an encryption identifier for the encryption key in an encryption table;

receiving a command to back up the database table;

in response to the command, generating a backup of the encrypted version of the database table;

storing the backup of the encrypted version of the database table; and in accordance with a determination that a current date is at least the expiration date for the encryption key, deleting the encryption key from the encryption table.

\* \* \* \* \*